US009579552B2

(12) United States Patent
Martin et al.

(10) Patent No.: US 9,579,552 B2
(45) Date of Patent: Feb. 28, 2017

(54) DISC GOLF DISC LOCATION SYSTEM

(71) Applicants: Christopher Leon Martin, Indian Land, SC (US); Yong Juay Lee, Singapore (SG)

(72) Inventors: Christopher Leon Martin, Indian Land, SC (US); Yong Juay Lee, Singapore (SG)

( * ) Notice: Subject to any disclaimer, the term of this patent is extended or adjusted under 35 U.S.C. 154(b) by 0 days.

(21) Appl. No.: 14/702,122

(22) Filed: May 1, 2015

(65) Prior Publication Data
US 2015/0319562 A1 Nov. 5, 2015

Related U.S. Application Data

(60) Provisional application No. 61/987,908, filed on May 2, 2014.

(51) Int. Cl.
*G08B 5/22* (2006.01)
*A63B 67/06* (2006.01)
*A63B 71/06* (2006.01)
*H04W 4/00* (2009.01)
*A63H 33/18* (2006.01)
*H04W 4/02* (2009.01)

(52) U.S. Cl.
CPC ............ *A63B 67/06* (2013.01); *A63B 71/06* (2013.01); *A63H 33/18* (2013.01); *H04W 4/008* (2013.01); *H04W 4/02* (2013.01); *H04W 4/025* (2013.01); *A63B 2071/0625* (2013.01); *A63B 2207/02* (2013.01); *A63B 2220/12* (2013.01); *A63B 2220/40* (2013.01); *A63B 2225/50* (2013.01)

(58) Field of Classification Search
CPC ........ A63H 33/18; A63H 30/04; A63B 67/06; A63B 2024/0053; A63B 2225/50; A63B 2225/54; A63B 2071/0625; A63B 2102/32; A63B 2220/12; A63B 2225/15; A63B 24/0021; H04W 4/008; H04W 4/02
USPC ........................................... 340/8.1
See application file for complete search history.

(56) References Cited

U.S. PATENT DOCUMENTS

| 5,536,195 | A | * | 7/1996 | Stamos | A63H 33/18 446/219 |
|---|---|---|---|---|---|
| 8,444,513 | B2 | | 5/2013 | Cournoyer | |
| 2003/0184013 | A1 | * | 10/2003 | Chodosh | A63B 67/06 273/139 |
| 2006/0199682 | A1 | * | 9/2006 | Holms | A63B 24/0021 473/570 |
| 2007/0207883 | A1 | * | 9/2007 | Kenner | A63H 33/18 473/588 |

(Continued)

OTHER PUBLICATIONS

"StickNFind—Bluetooth Powered ultra small Location Stickers", IndieGoGo campaign, https://www.indiegogo.com/projects/sticknfind-bluetooth-powered-ultra-small-location-stickers, Apr. 23, 2014.

(Continued)

*Primary Examiner* — Don N Vo
(74) *Attorney, Agent, or Firm* — James G. Passé; Passé Intellectual Property, LLC

(57) ABSTRACT

A system for locating a lost disc golf disc is disclosed. A disc having a Bluetooth transmitter is utilized to send a signal to a smartphone which measures the distance to the disc from the smartphone. Outfitted with a 3-axis accelerometer, the flight path of the disc golf disc can also be tracked.

10 Claims, 6 Drawing Sheets

(56) References Cited

U.S. PATENT DOCUMENTS

| | | | |
|---|---|---|---|
| 2010/0248873 A1* | 9/2010 | Cooper | A63B 41/08 473/599 |
| 2011/0250819 A1* | 10/2011 | Tashman | A63H 33/18 446/46 |
| 2012/0225739 A1* | 9/2012 | Cheshire | A63B 63/06 473/416 |
| 2013/0303314 A1* | 11/2013 | Tackett | A63B 67/06 473/571 |

OTHER PUBLICATIONS

"Real Time Location Systems", Clarinox Technologies, Pty Ltd, Nov. 2009.

\* cited by examiner

DISC GOLF DISC LOCATION SYSTEM

This application claims priority of U.S. provisional application No. 61/987,908 filed on May 2, 2014 and is incorporated in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to disc golf. In particular, the invention relates to a location system for locating and tracking the flight of a disc golf disc during the play of disc golf.

Description of Related Art

Disc golf, also known as Frisbee® golf, is a flying disc game, as well as a precision and accuracy sport, in which individual players throw a flying disc at a target. According to the Professional Disc Golf Association, "The object of the game is to traverse a course from beginning to end in the fewest number of throws of the disc." The number of disc golf courses doubled in the 8 years from 2000 to 2008 and continues to grow. The game is played in about 40 countries around the world.

Ed Headrick, who is now regarded as the "Father of Disc Golf", designed and installed the first standardized target course in what was then known as Oak Grove Park in La Canada Flintridge, Calif. (today the park is known as Hahamongna Watershed Park). Headrick worked for the San Gabriel, Calif.-based Wham-O Corporation and is credited for pioneering the modern era of disc sports. While at Wham-O, Headrick redesigned the Pluto Platter, reworking the rim height, disc shape, diameter, weight and plastics, creating a controllable disc that could be thrown accurately. Headrick marketed and pushed the professional model Frisbee® and "Frisbee" as a sport. Ed founded "The International Frisbee Association" (IFA) and began establishing standards for various sports using the Frisbee such as the sports called Distance, Flying Disc Freestyle and Guts.

The game involves a number of specialized discs and it is not unusual for a player to have 10 or more different types of discs for different playing situations. Each type of disc has a unique flight characteristic, so losing a disc can inhibit proper game play. Losing a game disc is, unfortunately, a frequent occurrence. When the disc goes in an errant manner it is not too difficult to lose the disc on the terrain or water features on a course. Since disc golf discs are relatively expensive, different methods of locating a lost disc have been utilized. The attachment of buzzers, lights, electromagnetic signals and the like have been used or suggested. These devices are susceptible to water damage and can land where a buzzer or light cannot be heard or seen. Attaching fizzy tablets like Alka-Seltzer brand headache tablets to a disc has also been utilized in order to find a disc under water when the disc lands in a pond or deep body of water. Water is a problem for any location device on land too, since courses being mostly grass, can be wet, especially after a rain. None of the systems suggested or available to disc golf players allow for tracking distance, speed, rotation or the like.

Accordingly, while there are some devices out there that partially solve the problems of locating a lost disc, there is not a complete system that meets all the needs of the disc golf player.

BRIEF SUMMARY OF THE INVENTION

It has been discovered that a Bluetooth transmitter which has been made water resistant (they are not usually water resistant) in a disc golf disc transmits the disc location to an app on the smartphone of a disc golf disc user, which will enable the user to locate a lost disc and also enables them to monitor the distance the disc travels after being thrown. Further, adding a 3-axis accelerometer allows for tracking flight, speed, and rotation, as well as recording/reporting the angle and distance on the smartphone app. In addition, it has been discovered that having a multi-textured grip aids in throwing the disc

DETAILED DESCRIPTION OF THE INVENTION

Figure 1:
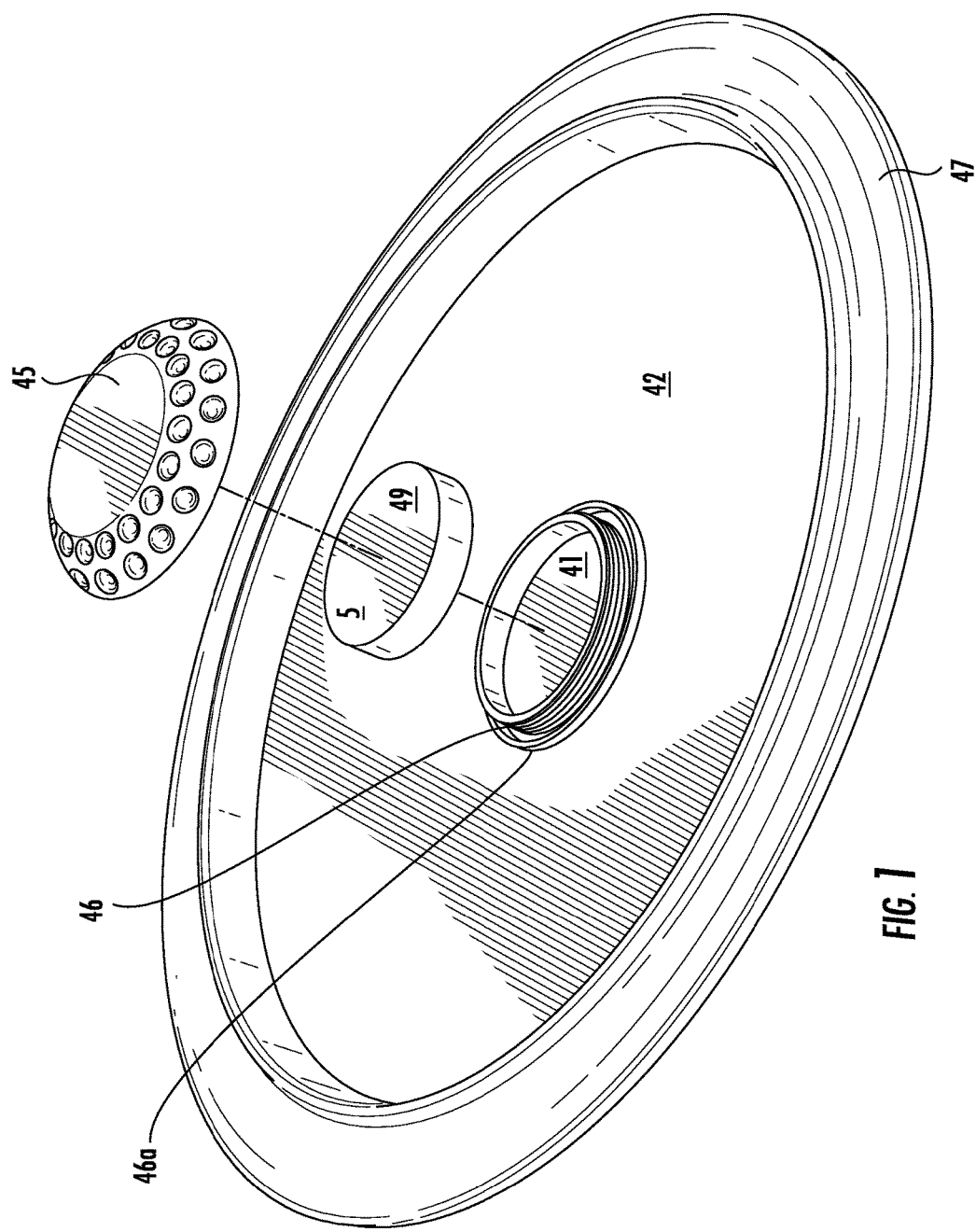
FIG. 1 is an exploded view of the bottom of a golf disc with a transmitter and weather cover.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

In one embodiment, the invention relates to a system for monitoring the flight of a disc golf disc thrown by a disc golf user comprising:
  a) a disc golf disc having mounted thereon a Bluetooth location transmitter which has been made water resistant, positioned in a bottom center of the disc golf disc such that it does not interfere with a flight characteristic of the disc golf disc;
  b) a smartphone adapted to receive a Bluetooth transmission from the Bluetooth location transmitter; and
  c) an app running in resident memory on the smartphone which tracks the Bluetooth signal from the transmitter and provides the distance from the smartphone to the disc golf disc on the smartphone.

In another embodiment, the invention relates to a disc golf disc which has mounted thereon a Bluetooth location transmitter which has been made water resistant and positioned in a bottom center of the disc golf disc such that it does not interfere with a flight characteristic of the disc golf disc.

In another embodiment there is a golf disc for use in playing disc golf comprising and upper and lower surface, a portion of which is smooth, a portion of which is finely textured, and a portion of which is roughly textured, the finely and roughly textured surfaces positioned to aid in the gripping of the golf disc while throwing.

DEFINITIONS

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitations thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term "monitoring" refers to the process of tracking and finding a disc golf disc after it has been thrown. In its simplest form it refers to determining the distance between the user holding a smartphone and the thrown disc. Where the user is still positioned in the spot where the disc was thrown from, it represents the distance the disc was thrown. In other situations, where one is trying to find the disc, it represents the distance to the disc. Though Bluetooth does not give direction, the user can determine direction by walking around and seeing if the distance to the disc (the transmitter) changes more or less until the direction is found. Also, wherein the system of the present invention is melded with a GPS system, wherein the location of the player and the disc on a disc golf course can be determined on a real time map.

As used herein, the phrase "disc golf disc" refers to one of the various discs used in the game of disc golf. Generally, they are about 8 or 9 inches in diameter, circular, and can have a variety of different edges, ridges and the like to affect the flying characteristics of a disc once thrown. Discs are generally circular, so to keep the flying characteristics from changing, any addition of a Bluetooth transmitter is accomplished by positioning the transmitter on the bottom center of the disc, as shown in the representative example drawings.

As used herein, the phrase "disc golf user" refers to the user or player of the system, basically the person who has thrown the disc and is monitoring it or trying to find the disc. In other words a person playing disc golf.

As used herein, the phrase "Bluetooth location transmitter" is a device that sends out an identifying Bluetooth signal, as known in the art, such that a person with a Bluetooth receiver in their smartphone can find the distance to the transmitter, as long as it is within the transmission range of the transmitter. It can be battery (regular or rechargeable) powered, solar powered, or the like. Generally, the transmission range distance is about 100 feet or more, but depends on the particular device, the strength of the battery, and the like within the skill of the art. Bluetooth transmitters are well known to be very sensitive to water. In general, the transmitter will be disc-shaped and as balanced as possible, in order to, when placed on the disc golf disc, be such that it does not interfere with the flight characteristics of the flying disc. Any weight or shape variances could radically change the flight of the disc. In one embodiment, there is also a 3-axis accelerometer (in the transmitter or separate) which can track the speed, acceleration, rotation, and angle of the disc during flight, as well as the distance. The accelerometer would include interaction on the Bluetooth transmitter for transmitting the accelerometer data to the application software ("app") in the smartphone for recording and/or reporting. 3-axis accelerometers are known within the art.

As used herein the phrase "water resistant" refers to the transmitter being protected from the incursion of water during most of the normal conditions of playing disc golf such as rain, puddles, shallow bodies of water and the like. In other words, the device is water proof as long as the conditions of water depth, amount of rain, and the like are not exceeded. In one embodiment, the device is water resistant to a depth of about 10 feet. In other embodiments it could be water resistant to a deeper depth. Water resistance can be done by placing the transmitter in a water-resistant housing or creating a seal covered (sealed between the cover and disc e.g. with a sealing washer or an o-ring) such that the disc is enclosed. The housing can be added to a disc, be part of the disc, or part of the disc/part added on. The housing can be made water resistant by adding o-rings or ribs on the disc mounted with the housing cover. In one embodiment, there is one or more perpendicular ribs and, in an embodiment, circular ribs, as shown in the figures, on the underside of the disc, and a housing cover which mates with an o-ring for water resistance (as shown e.g. on FIG. 4). One or more of the perpendicular ribs may have side ribs which can lock with a perpendicular rib having side ribs on the housing cover. As used herein, the term "positioned" refers to attaching the Bluetooth transmitter on the underside bottom center of a disc golf disc as close to perfectly in the center as possible, such that the spinning action of the disc is not upset by weight that is unevenly distributed. The positioning can be by glue, tape, housing, or any method of attachment desired. In one embodiment, the disc is positioned by one or more sealing o-rings, which hold a cover over the transmitter and seal it, making it water resistant. The water resistant sealing shown will also hold the transmitter positioned where desired. This embodiment is shown and exemplified in the figures and their description. The cover can attach by any means, such as a screwing (as shown in the Figures), clips, screws, snapping, or the like.

As used herein the phrase "bottom center of the disc golf disc" refers to the balance center of the disc on the bottom, as shown in the figures. By attaching a disc-shaped transmitter, with the center of the transmitter directly over the center of the disc, the best balance and least amount of change in any flying characteristics is achieved.

As used herein, the phrase "does not interfere with a flight characteristic" refers to making sure the addition of the transmitter does not change the balance and spinning characteristics of the disc such that it changes how the disc flies when thrown. If the transmitter is lopsided it will cause an oscillation that will detrimentally change how the disc flies. Weight and position can be determined by one skilled in the art in view of this disclosure.

As used herein, the term "smartphone" refers to a cell phone or other mobile device (phone or not) having computing power to run an app which is in resident memory on the smartphone. It can also include a GPS system operating in resident memory on the smartphone.

As used herein the phrase "app in resident memory" refers to a self-contained software program or piece of software designed to fulfill a particular purpose; an application, especially as downloaded by a user to a mobile device, such as the smartphone of the present invention. Apps are within the understanding and use of those skilled in the art. The app can do other functions besides take the information from the transmitter and give a distance. It could also keep track of the distance of each throw during a game, for example, or any other utility desired. Where a 3-axis accelerometer is used, it can track speed, rotation, angle and distance, and report this data to the user of the app on the smartphone. In use, the app would produce a screen like a radar map, or the like, and show the distance to the disc or other desired information. As the user walks around, the distance to the object would change thus allowing the user to locate a lost disc.

As used herein, the phrase "locating light" refers to a solid or blinking light on the disc golf disc that a user can see to locate the disc if it is lost. The light can be part of the transmitter or a separate device, and must also be balanced to prevent changing the flight characteristics of the disc.

As used herein the phrase "device for making a locator sound" is a device which makes a sound, such as a beep or the like, in order for a user to locate the disc golf disc if it is lost. The device for producing a sound can be part of the transmitter or a separate device, and must also be balanced to prevent changing the flight characteristics of the disc.

As used herein, the term "GPS" refers to a global positioning system running on the smartphone which can produce a map of the general surroundings of the user. In general, GPS is only accurate to about 20 feet, so it cannot be used to locate a disc thrown longer distances. However, the system of the present invention, in combination with the GPS, can produce a mapped image with the location of the disc on the map.

As used herein, the term "housing" refers to an enclosure cup or the like for encasing the transmitter. In one embodiment, the housing is water resistant in nature to some specific degree. In one embodiment, it is at least partially molded into the disc.

Figure 4:
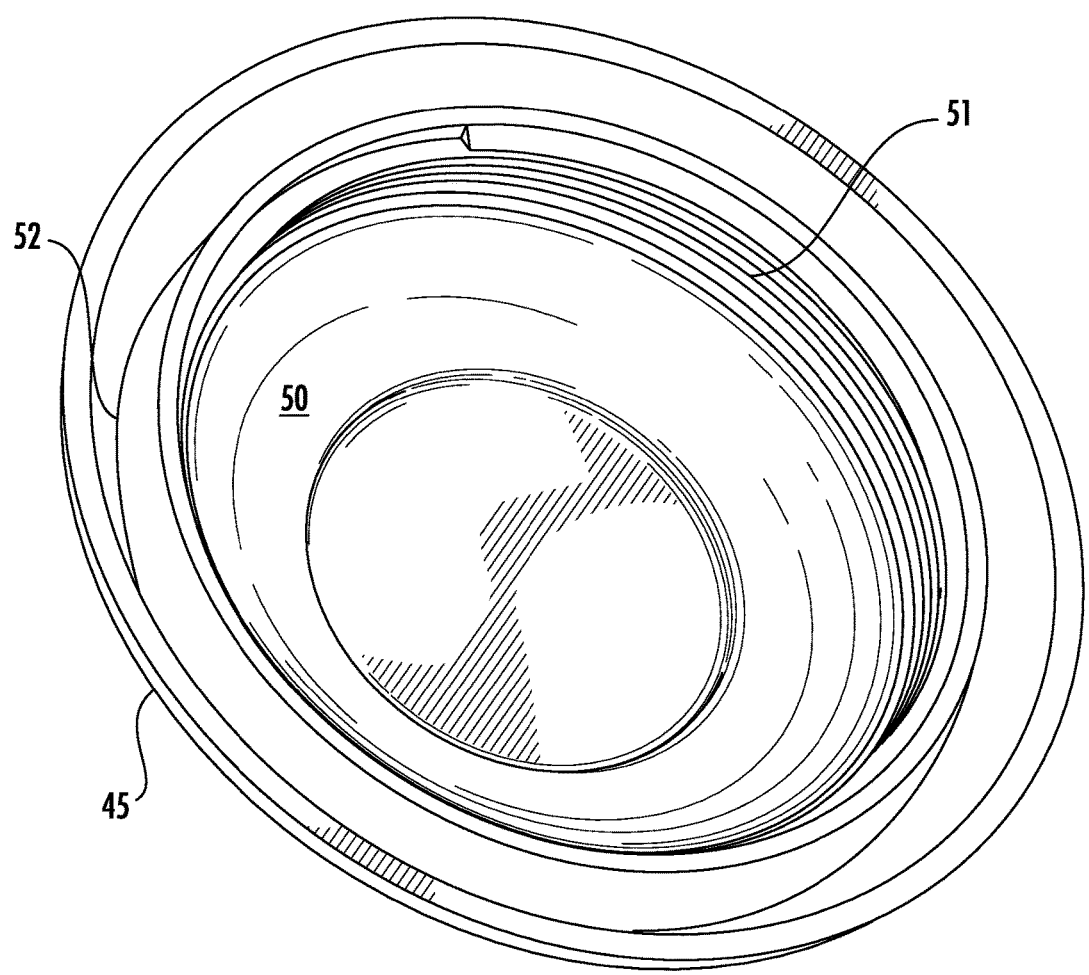
FIG. 4 is a perspective view of the underside of the weather cover.

Now referring to the drawings, FIG. 1 depicts a perspective of the water resistant housing for keeping the transmitter dry. Part of the housing is molded into the disc, part of it is a housing cover. In this view, there is a cup 41 in the bottom 42 of disc 47 for accepting a transmitter. Cup 41 has screw teeth 46, and sealing ridge 46a will mate with the weather-cap o-ring 45, as seen in FIG. 4. Transmitter 49 fits in cup 41 and is sealed by cap 45 by screws in place till o-ring meets sealing ridge 46a.

Figure 2:
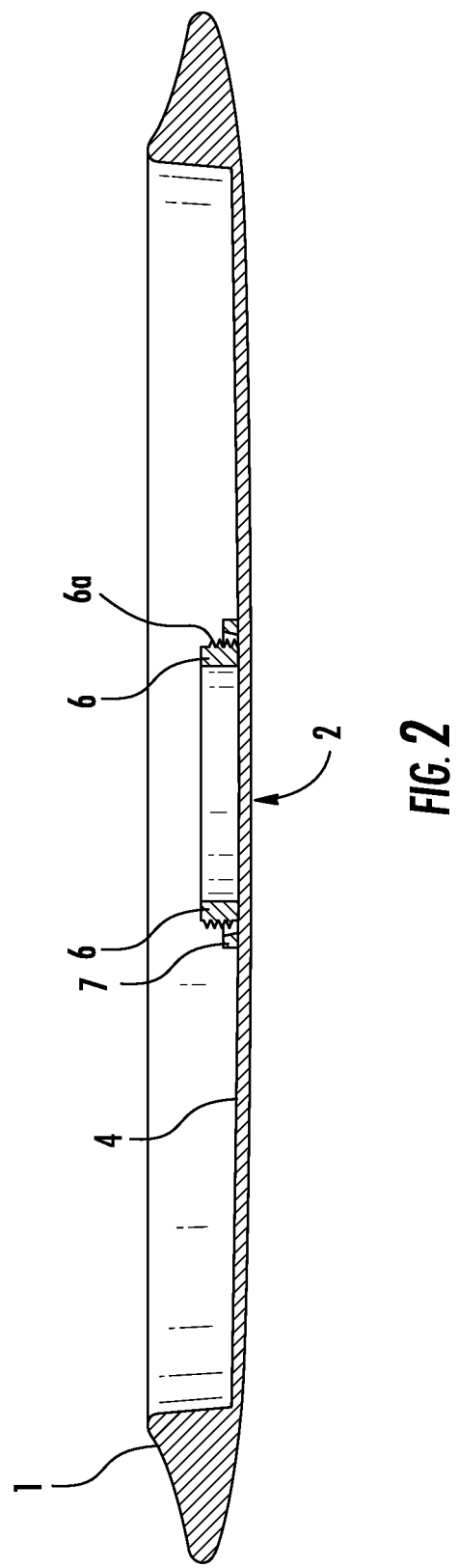
FIG. 2 is a cross section of the golf disc without transmitter or cap.

FIG. 2 is a cross-sectional view of a disc golf disc of the present invention without the transmitter. In this view, disc 1 is shown with center point 2 and having a cup 6 for holding a Bluetooth transmitter 49 mounted in the center on underside of disc 4. The transmitter 49 has an outward facing side 5. Cup 6 has teeth 6a for screwing a cup in place. Also shown is mating ring 7 for the o-ring of a cap to form a water resistant seal.

Figure 3:
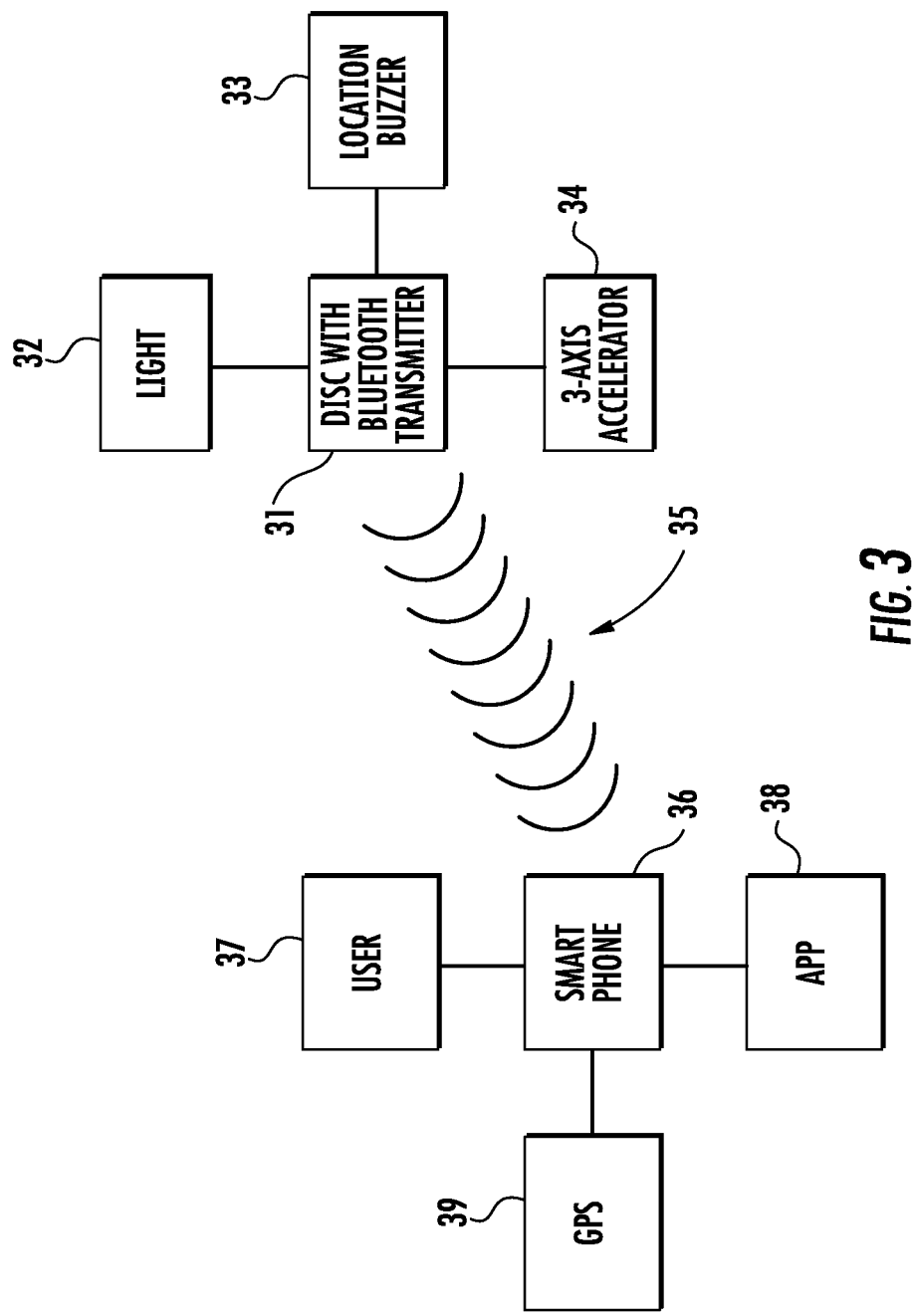
FIG. 3 shows the system of the present invention including optional embodiments.

FIG. 3 depicts the system of the present invention. In this view, a disc with a Bluetooth transmitter 31 is also outfitted with light 32, location buzzer 33 and an optional 3-axis accelerometer 34 coupled with the transmitter 31 such that accelerometer data is sent to the smartphone 36 in real time allowing one to track acceleration, distance, speed, rotation, angle and location and the like during the flight of disc 31. Bluetooth transmitter 31 sends out a blue tooth signal 35 which is picked up by Bluetooth equipped smartphone 36 held by user 37 the phone 36 having the app 38 of the program to find the disc transmitting the Bluetooth signal. In an optional embodiment the smartphone is equipped with a GPS system 39 which couples with the app 38 to show location of the disc on a real time GPS map which combined with the Bluetooth signal.

FIG. 4 is the underside perspective weather cap 45. The underside 50 shows cap screw teeth 51 which mate with cap screw teeth 46 (FIG. 1). O-ring 52 mates with sealing ridge 46a when cap 45 is screwed in place on cup 41.

Figure 5:
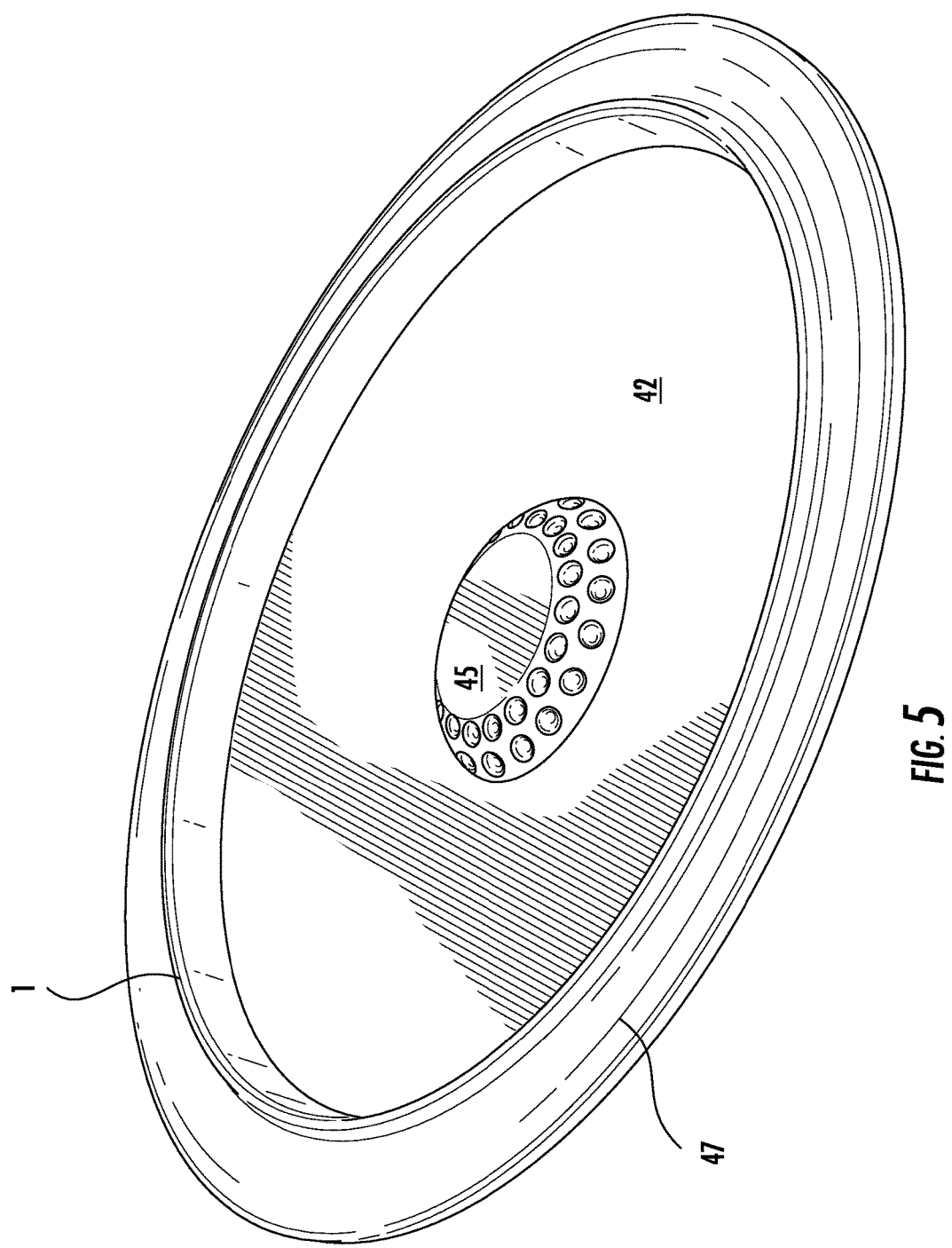
FIG. 5 is a perspective of the assembled golf disc.

FIG. 5 is a bottom perspective of an assembled disc golf disc of the invention. Weather cap 45 is screwed in place on the bottom 42 of disc golf disc 47.

Figure 6:
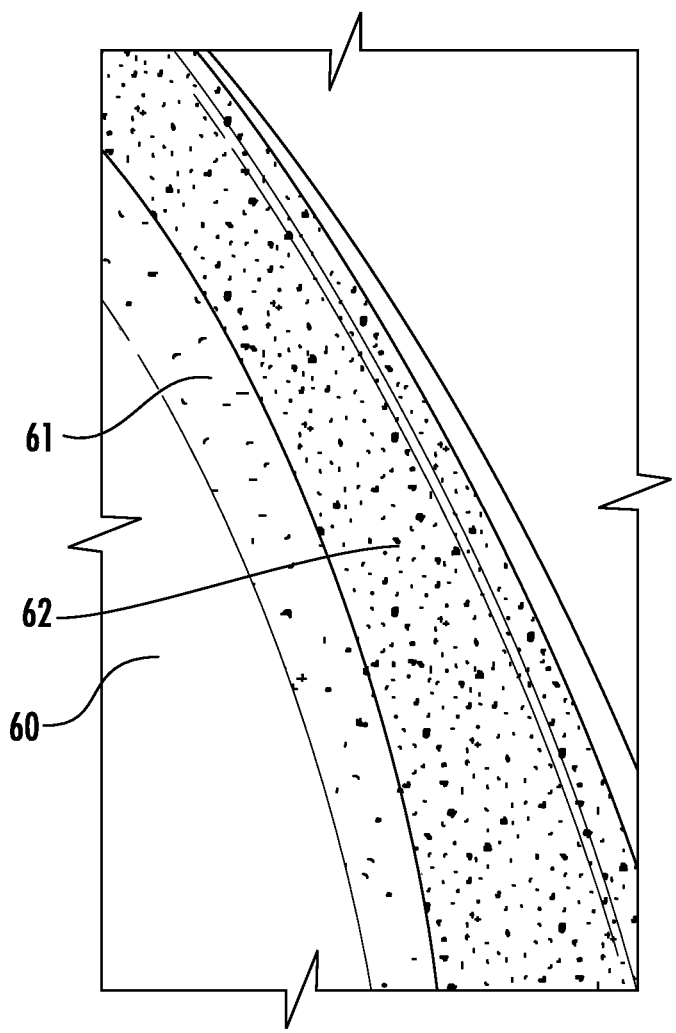
FIG. 6 is a perspective view of the bottom of a disc with smooth, fine texture and rough texture.

FIG. 6 is a bottom or top view wherein the surface of the disc is multi-textured. Smooth surface 60 is standard on golf discs and the textured surfaces can be placed circumferentially, or as needed such that a portion is smooth, a portion fine textured, rough textured, or both. The terms fine and rough texture are relative to one another and not limited in understanding. In this embodiment, in addition to a smooth surface on the top and/or bottom, both a finely textured surface 61 and a roughly textured surface 62 are molded into the disc where they aid in gripping, and one skilled in the art can place them in the best position in view of this disclosure.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the Applicant.

What is claimed is:

1. A system for monitoring the flight of a disc golf disc thrown by a disc golf user on a disc golf course comprising:
   a) a disc golf disc having an integrated housing positioned in a bottom center of the disc golf disc for positioning devices therein, the devices comprising:
      i. a removable Bluetooth location transmitter which has been made water resistant by positioning the transmitter within the housing, wherein the housing is made water resistant by means of one or more perpendicular ribs on the disc which mate via a threaded pattern with a dimpled cover, and an O-ring, positioned in the housing such that the transmitter does not interfere with the flight characteristics of the disc golf disc, which transmitter tracks the position of the user and the direction that the disc is located; and
      ii. a removable GPS device for indicating the location of the disc golf disc;
   b) a smartphone adapted to receive a transmission from the Bluetooth location transmitter indicating the step by step directions from the smartphone to the disc and adapted to receive a transmission from the GPS device indicating the location of the disc golf disc; and
   c) an app running in resident memory on the smartphone which tracks the signal from the Bluetooth transmitter and GPS location and provides the step by step directions to the disc golf disc on a real time map.

2. The system according to claim 1 wherein the disc is further outfitted with a device that has at least one of a locating light and a device for making a locator sound.

3. The system according to claim 1 wherein the app records the distance, velocity, angle, speed of the rotation, and flight path for all of the disc throws of a user during a game of disc golf.

4. The system according to claim 1 wherein the dimpled cover of the housing screws into the housing via a threaded pattern to create a water tight seal with an O-ring.

5. The system according to claim 1 which further comprises an accelerometer positioned in the disc golf disc which can transmit its information to the app in the smartphone.

6. The system according to claim 5 wherein the accelerometer transmitted information is at least one of the disc's distance, velocity of the disc's forward momentum, angle, speed of the disc rotation, and flight path.

7. The system according to claim 1 wherein the system further comprises at least one of a device for making a locating sound, and a locating light.

8. The disc, according to claim 1, wherein a portion of the lower surface of the disc is smooth, a portion is finely textured and a portion is roughly textured, the fine and rough textures positioned where it can aid in gripping of the disc.

9. The disc according to claim 8 wherein the fine and rough textures are positioned concentrically on the lower surface of the disc near an edge of the disc.

10. The system according to claim 6 wherein the system records the speed of the disc rotation and velocity of the disc's forward momentum for presentation to the user.

* * * * *